(12) United States Patent
Nakajima et al.

(10) Patent No.: US 11,546,421 B2
(45) Date of Patent: Jan. 3, 2023

(54) CONNECTION MANAGEMENT DEVICE FOR CONNECTION TO SECURE SERVER CONNECTION MANAGEMENT SYSTEM FOR CONNECTION TO SECURE SERVER CONNECTION MANAGEMENT METHOD FOR CONNECTION TO SECURE SERVER AND PROGRAM

(71) Applicant: Mitsubishi Electric Corporation, Tokyo (JP)

(72) Inventors: Yoshinori Nakajima, Tokyo (JP); Kanji Mizuno, Tokyo (JP); Masayuki Komatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/439,082

(22) PCT Filed: Apr. 3, 2019

(86) PCT No.: PCT/JP2019/014899
§ 371 (c)(1),
(2) Date: Sep. 14, 2021

(87) PCT Pub. No.: WO2020/202518
PCT Pub. Date: Oct. 8, 2020

(65) Prior Publication Data
US 2022/0159066 A1    May 19, 2022

(51) Int. Cl.
*G06F 15/173* (2006.01)
*H04L 67/1012* (2022.01)
(Continued)

(52) U.S. Cl.
CPC ...... *H04L 67/1012* (2013.01); *H04L 67/1014* (2013.01); *H04L 67/1021* (2013.01); *H04L 67/1023* (2013.01); *H04L 67/63* (2022.05)

(58) Field of Classification Search
CPC ............ H04L 67/1012; H04L 67/1014; H04L 67/1021; H04L 67/1023; H04L 67/327
(Continued)

(56) References Cited

U.S. PATENT DOCUMENTS 6,728,748 B1 * 4/2004 Mangipudi ......... H04L 67/1023
                                                          718/105
7,058,633 B1 * 6/2006 Gnagy ................ G06F 16/9566
                                                          707/E17.115
(Continued)

FOREIGN PATENT DOCUMENTS

EP    1753195 A1    2/2007
FR    2 892 263 A1  10/2005
(Continued)

OTHER PUBLICATIONS

Extended European Search Report dated Feb. 18, 2022, in the corresponding EP patent application No. 19923119.2.
(Continued)

*Primary Examiner* — Alicia Baturay
(74) *Attorney, Agent, or Firm* — Posz Law Group, PLC

(57) ABSTRACT

A connection management device is communicatively connected to a plurality of server devices. A receiver receives from a terminal device a request for connection to one of the plurality of server devices. A location information extractor extracts, from the request for connection, location information indicating a location where the terminal device exists. A region determiner determines, based on the extracted location information, a region where the terminal device exists. A connection destination determiner determines, based on the determined region, which of the plurality of server devices is the server device to which the terminal (Continued)

device is to connect. A transmitter transmits to the determined server device the request for connection received from the terminal device.

19 Claims, 17 Drawing Sheets

(51) Int. Cl.
  *H04L 67/63* (2022.01)
  *H04L 67/1014* (2022.01)
  *H04L 67/1021* (2022.01)
  *H04L 67/1023* (2022.01)
(58) Field of Classification Search
  USPC .......................................................... 709/224
  See application file for complete search history.

(56) References Cited

U.S. PATENT DOCUMENTS

| | | | | |
|---|---|---|---|---|
| 7,209,977 | B2* | 4/2007 | Acharya | H04L 69/162 |
| | | | | 709/240 |
| 7,254,636 | B1* | 8/2007 | O'Toole, Jr. | G06F 16/10 |
| | | | | 709/225 |
| 7,406,540 | B2* | 7/2008 | Acharya | H04L 45/306 |
| | | | | 709/240 |
| 7,565,413 | B1* | 7/2009 | O'Toole, Jr. | H04L 67/06 |
| | | | | 709/219 |
| 7,697,557 | B2* | 4/2010 | Segel | H04L 67/104 |
| | | | | 370/429 |
| 9,800,690 | B1* | 10/2017 | Clarke | H04L 67/563 |
| 9,886,703 | B2* | 2/2018 | Muttineni | H04W 4/029 |
| 10,187,745 | B1* | 1/2019 | Zhao | H04L 43/10 |
| 10,219,290 | B2* | 2/2019 | Zou | H04W 72/1252 |
| 10,349,208 | B1* | 7/2019 | Liang | G06F 16/29 |
| 10,547,971 | B2* | 1/2020 | Liang | G06N 20/00 |
| 10,616,294 | B2* | 4/2020 | Shribman | H04L 65/612 |
| 10,735,742 | B2* | 8/2020 | Petajan | H04N 19/154 |
| 10,762,141 | B2* | 9/2020 | Liang | G06F 16/9537 |
| 10,880,682 | B2* | 12/2020 | Liang | H04W 4/021 |
| 10,891,200 | B2* | 1/2021 | Spurlock | H04L 63/1425 |
| 10,911,926 | B2* | 2/2021 | Pellegrini | G06F 16/29 |
| 10,939,179 | B2* | 3/2021 | Park | H04N 21/482 |
| 11,063,907 | B2* | 7/2021 | Spurlock | G06F 11/3058 |
| 11,206,306 | B2* | 12/2021 | Spurlock | G06F 9/5005 |
| 11,212,304 | B2* | 12/2021 | Spurlock | G06F 17/40 |
| 2009/0291673 | A1 | 11/2009 | Chauvigne et al. | |
| 2012/0078643 | A1 | 3/2012 | Nagpal et al. | |
| 2012/0274510 | A1* | 11/2012 | Lee | G01S 19/252 |
| | | | | 342/357.31 |
| 2014/0351323 | A1 | 11/2014 | Sumida et al. | |
| 2020/0233959 | A1* | 7/2020 | Spurlock | G06F 11/301 |
| 2020/0349608 | A1* | 11/2020 | Liang | G06Q 30/0205 |
| 2020/0366683 | A1* | 11/2020 | Sugawara | H04L 9/3247 |
| 2021/0067555 | A1* | 3/2021 | Wang | H04L 41/147 |
| 2021/0266722 | A1* | 8/2021 | Pellegrini | G06F 16/29 |
| 2021/0314295 | A1* | 10/2021 | Spurlock | G06F 11/1464 |
| 2022/0027417 | A1* | 1/2022 | Katz | G06F 16/90335 |
| 2022/0078237 | A1* | 3/2022 | Spurlock | G06F 11/3055 |
| 2022/0103523 | A1* | 3/2022 | Starr | H04L 67/52 |

FOREIGN PATENT DOCUMENTS

| | | | |
|---|---|---|---|
| JP | 2008-083910 A | | 4/2008 |
| JP | 2009-512297 A | | 3/2009 |
| JP | 2009-245345 A | | 10/2009 |
| JP | 2017-027318 A | | 2/2017 |
| JP | 2017-134530 A | | 8/2017 |
| KR | 10-2018-0131435 A | | 12/2018 |
| WO | 2013/065161 A1 | | 5/2013 |
| WO | 2018/216115 A1 | | 11/2018 |
| WO | WO-2019075120 A1 * | 4/2019 | ............ G06N 20/00 |

OTHER PUBLICATIONS

International Search Report dated May 21, 2019 issued in the corresponding International Application No. PCT/JP2019/014899.
Office Action dated Oct. 25, 2022, issued in the corresponding JP Patent Application No. 2021-511022 (with English translation).

* cited by examiner

FIG. 6

| REGION | | REGIONAL INFORMATION DATA | | | |
|---|---|---|---|---|---|
| | | EASTERNMOST POINT | WESTERNMOST POINT | SOUTHERNMOST POINT | NORTHERNMOST POINT |
| A | LATITUDE | 2416.5993, N | 2426.5812, N | 2025.3101, N | 4533.2622, N |
| | LONGITUDE | 15359.119, E | 12256.015, E | 13604.111, E | 14845.083, E |
| B | LATITUDE | 1745.1983, N | 1326.5143, N | 1434.1166, S | 7123.2025, N |
| | LONGITUDE | 6433.5419, W | 14437.557, E | 16809.107, W | 15628.455, W |
| .. | .. | .. | .. | .. | .. |

FIG. 7

| REGIONAL INFORMATION DATA | |
|---|---|
| REGION | GLOBAL IP ADDRESS |
| A | 1.0.16.0 - 1.0.31.255, 1.0.64.0 - 1.0.127.255, .... |
| B | 3.0.0.0 - 4.255.255.255, 5.35.192.0 - 5.35.199.255, .... |
| : | : |

FIG. 10

| ID | PERSONAL INFORMATION DATA ||||||| OPERATION HISTORY ||||
| | NAME | ADDRESS | EMAIL ADDRESS | SEX | AGE | OPERATION TIME 1 | SETTING TEMPERATURE 1 | OPERATION TIME 2 | SETTING TEMPERATURE 2 | ... |
|---|---|---|---|---|---|---|---|---|---|---|
| 1 | Anna Smith | DISTRICT a, CITY A | aaa@aaa.com | FEMALE | 29 | 2019/12/1 6:00:00 | 25 | 2019/12/1 6:00:00 | 25 | ... |
| 2 | Jane Smith | DISTRICT b, CITY A | bbb@bbb.com | FEMALE | 35 | 2019/12/1 6:30:00 | 26 | 2019/12/1 6:30:00 | 26 | ... |
| 3 | John Smith | DISTRICT w, CITY B | ccc@ccc.com | MALE | 32 | 2019/12/1 7:00:00 | 26 | 2019/12/1 7:00:00 | 26 | ... |
| .. | .. | .. | .. | .. | .. | .. | .. | .. | .. | ... |

CONNECTION MANAGEMENT DEVICE FOR CONNECTION TO SECURE SERVER CONNECTION MANAGEMENT SYSTEM FOR CONNECTION TO SECURE SERVER CONNECTION MANAGEMENT METHOD FOR CONNECTION TO SECURE SERVER AND PROGRAM

CROSS REFERENCE TO RELATED APPLICATION

This application is a U.S. national stage application of International Patent Application No. PCT/JP2019/014899 filed on Apr. 3, 2019, the disclosure of which is incorporated herein by reference.

TECHNICAL FIELD

The present disclosure relates to a connection management device, a connection management system, a connection management method, and a program.

BACKGROUND

Recent prevalence of cloud computing offers easier data transfer to and storage in various countries, regions, and the like. However, different countries, regions, and so on have different laws and regulations on data processing that are to be complied with. For example, Europe has the EU General Data Protection Regulation (GDPR). The EU GDPR is a regulation designed to improve personal data protections and prohibits transfer of the personal data outside the European Economic Area.

In view of such circumstances, techniques of processing data while avoiding risks of non-compliance with the laws and regulations are proposed. For example, Patent Literature 1 discloses a technique of determining whether or not there is a possibility that uploading of data to a server device specified by a user is non-compliant with the laws and regulations, and presenting a result of the determination.

PATENT LITERATURE

Patent Literature 1: International Publication No. WO2013/065161

Such a technique as described above can provide knowledge of whether or not uploading to the specified server fails to comply with the laws and regulations, but does not guarantee connection to a secure server device that avoids the risk of non-compliance with the laws and regulations. If the user at the time of data uploading specifies the server device, the user may specify, by erroneous operation or intentionally, a server device that is non-compliant with the laws and regulations.

SUMMARY

In view of the above circumstances, an objective of the present disclosure is to provide a connection management device, connection management system, a connection management method, and a program capable of automatic connection of a terminal device to a secure server device that avoids the risk of non-compliance with laws and regulations.

To achieve the above objective, a connection management device according to the present disclosure is a device capable of communicating with a plurality of server devices, and includes reception means for receiving from a terminal device a request for connection to one of the plurality of server devices; location information extraction means for extracting, from the request for connection, location information indicating a location where the terminal device exists; region determination means for determining, based on the location information extracted by the location information extraction means, a region where the terminal device exists; connection destination determination means for determining, based on the region determined by the region determination means, which of the plurality of server devices is the server device to which the terminal device is to connect; and transmission means for transmitting, to the server device determined by the connection destination determination means, the request for connection received from the terminal device.

The present disclosure enables automatic connection of a terminal device to a secure server device to be connected to, based on a region where the terminal device exists. This can ensure an administrator of the server device complies with the laws and regulations on processing of data to be acquired from the terminal device.

BRIEF DESCRIPTION OF DRAWINGS

FIG. 6 is a diagram illustrating regional information data according to Embodiment 1;

FIG. 7 is a diagram illustrating regional information data according to Embodiment 1;

FIG. 10 is a diagram illustrating personal information data according to Embodiment 1;

DETAILED DESCRIPTION

Embodiment 1

Figure 1:
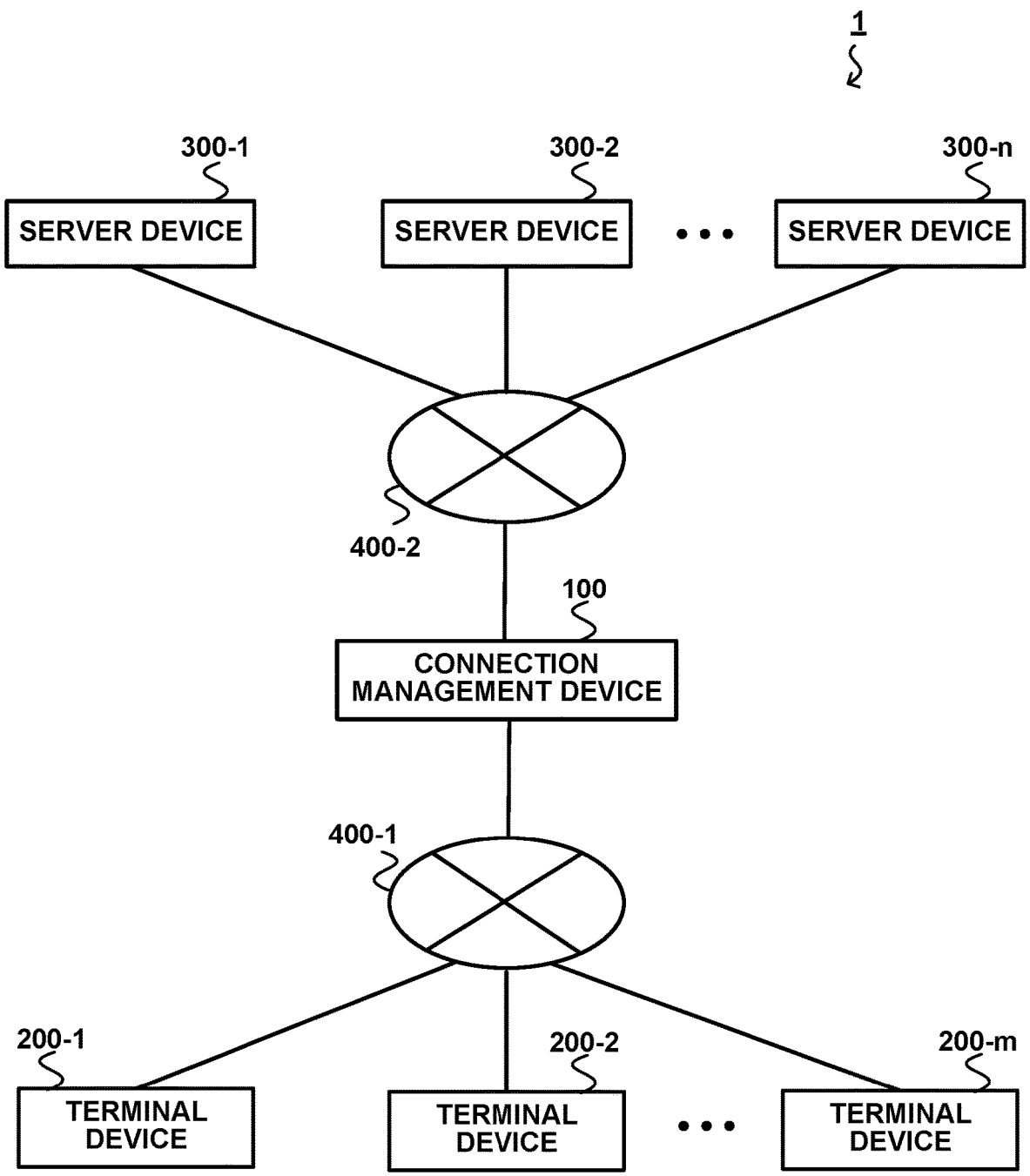
FIG. 1 is a block diagram illustrating an overall configuration of a connection management system according to Embodiment 1.

A connection management system according to Embodiment 1 is a system capable of connecting a terminal device to a secure server device that avoids a risk of non-compliance with laws and regulations on processing of data of the terminal device. As illustrated in FIG. 1, a connection management system 1 includes a connection management device 100 that determines a server device to which the terminal device is to connect, terminal devices 200-1, 200-2, . . . , 200-m (m represents a natural number not less than 2) that request connection to a server device, and server devices 300-1, 300-2, . . . , 300-n (n represents a natural number not less than 2) that establish connection to the terminal device to transmit and receive data. The terminal devices 200-1, 200-2, . . . , 200-m are collectively referred to as a terminal device 200, and the server devices 300-1, 300-2, . . . , 300-n are collectively referred to as a server device 300.

Relationships among the connection management device 100, the terminal device 200, and the server device 300 are described with reference to FIG. 1.

The connection management device 100 communicates with a plurality of terminal devices 200 via a network 400-1 and communicates with a plurality of server devices 300 via a network 400-2. The connection management device 100 receives from a terminal device 200 a request for connection to a server device 300, determines the server 300 to which the terminal device 200 is to connect, and transmits to the determined server device 300 the request for connection.

The terminal device 200 is a device used by a user who receives a service provided by the server device 300. Examples of the terminal device 200 include a personal computer, a smartphone, and a tablet terminal. The terminal device 200 may be a device that is owned by the user or is lent out by a provider of the service.

The terminal device 200 may be arranged to connect to the connection management device 100 existing in the same region after connecting to the connection management device 100 existing in another region and then receiving the response from the server device 300 existing in the same region. For example, after transmitting to the connection management device 100-1 existing in the region A the request for connection and then receiving the response from the server device 300-2 existing in the region B, the terminal device 200-2 may transmit to the connection management device 100-2 existing in the region B the request for connection again.

The networks 400-1 and 400-2 are wireless or wired communication networks, and examples of the networks 400-1 and 400-2 include the Internet, an intranet, an extranet, a local area network (LAN), a virtual private network (VPN), and a telephone network.

In the present embodiment, the server device 300 is assumed to provide services for automatic control of an air conditioner. The terminal device 200 is a device used by a user who operates the air conditioner, and has an installed application for operation of the air conditioner. Upon the user initially starting this application in the terminal device 200 after installing the application, a request for connection to the server device 300 is transmitted from the terminal device 200 to the connection management device 100. Upon establishment of the connection between the terminal device 200 and the server device 300, the server device 300 automatically controls the air conditioner operated by the user of the terminal device 200. The user can receive services such as power reception condition-based automatic control, automatic inspection, and the like.

Figure 2:
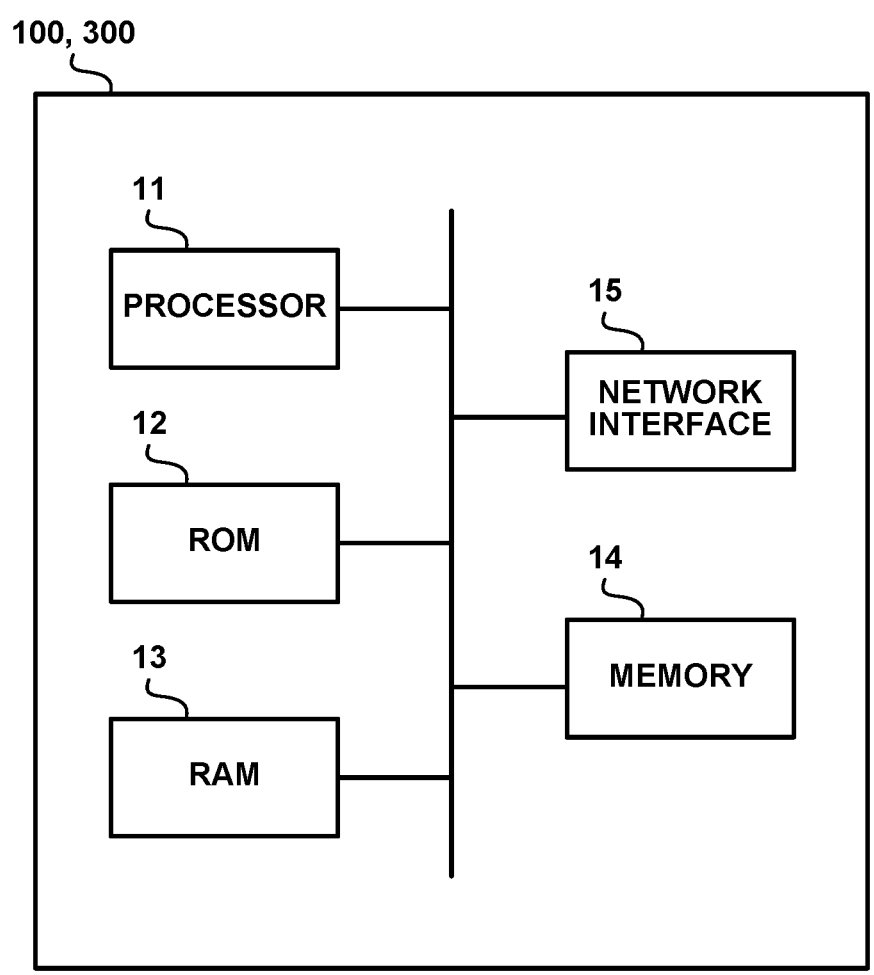
FIG. 2 is a block diagram illustrating a hardware configuration of a connection management device and a server device according to Embodiment 1.

Next, hardware configurations of the connection management device 100 and the server device 300 are described with reference to FIG. 2.

The connection management device 100 and the server device 300 each include a processor 11 that controls an operation of a device, a read only memory (ROM) 12 that stores a program, a random access memory (RAM) 13 that is a work area, a memory 14 that can read and write data, and a network interface 15 for connecting to a network. The components are connected to one another via a bus.

The processor 11 includes a central processing unit (CPU). The processor 11 implements functions of the connection management device 100 and the server device 300 by executing a program stored in the ROM 12.

The ROM 12 stores the program and the data for controlling the whole operation of the connection management device 100 and the server device 300.

The RAM 13 serves as a work area for the processor 11. The processor 11 temporarily writes the program and the data to the RAM 13 and refers to the program and the data as appropriate.

The memory 14 is a readable/writable non-volatile memory, such as an electrically erasable programmable read-only memory (EEPROM), a flash memory, or the like.

The network interface 15 is an interface for connection of the connection management device 100 to the networks 400-1 and 400-2, and for connection of the server device 300 to the network 400-2. The network interface 15 includes a local area network (LAN) interface such as a network interface card (NIC).

Figure 3:
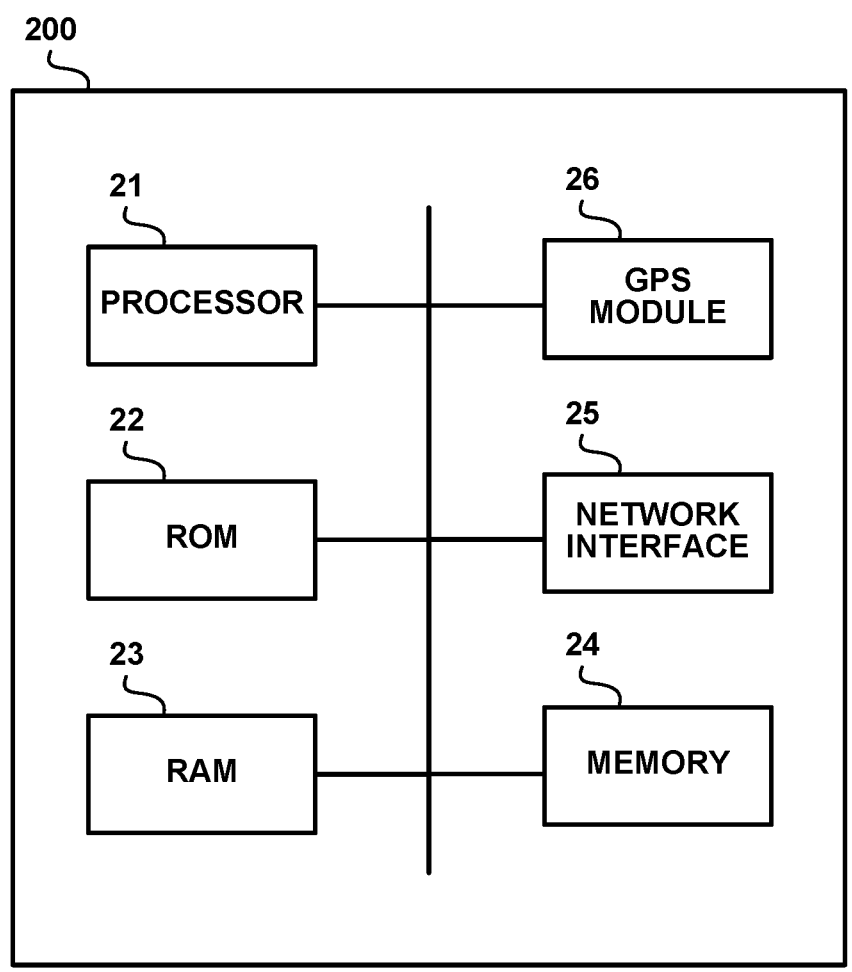
FIG. 3 is a block diagram illustrating a hardware configuration of a terminal device according to Embodiment 1.

A hardware configuration of the terminal device 200 is described with reference to FIG. 3.

The terminal device 200 includes a processor 21 that controls an operation of a device, a ROM 22 that stores a program, a RAM 23 that is a work area, a memory 24 that can read and write data, a network interface 25 for connection to a network, and a global positioning system (GPS) module 26 that finds a location of the terminal device 200. The components are connected to one another via a bus.

The processor 21 includes a CPU. The processor 21 implements functions of the terminal device 200 by executing a program stored in the ROM 22.

The ROM 22 stores the program and the data for controlling the whole operation of the terminal device 200.

The RAM 23 serves as a work area for the processor 21. The processor 21 temporarily writes the program and the data to the RAM 23 and refers to the program and the data as appropriate.

The memory 24 is a readable/writable non-volatile memory such as an EEPROM, a flash memory, or the like.

The network interface 25 is an interface for connection of the terminal device 200 to the network 400-1. The network interface 25 includes a LAN interface such as an MC.

The GPS module 26 determines latitude and longitude of a place where the terminal device 200 exists using information received from a GPS satellite.

A connection topology of the connection management device 100, the terminal device 200, and the server device 300 upon initial start of an application after installation in the terminal device 200 is described with reference to FIG. 4. A case in which requests for connection are transmitted by two terminal devices 200-1 and 200-2 in which the application for operation of air conditioners 500-1 and 500-2 are installed is described as an example hereinafter.

Figure 4:
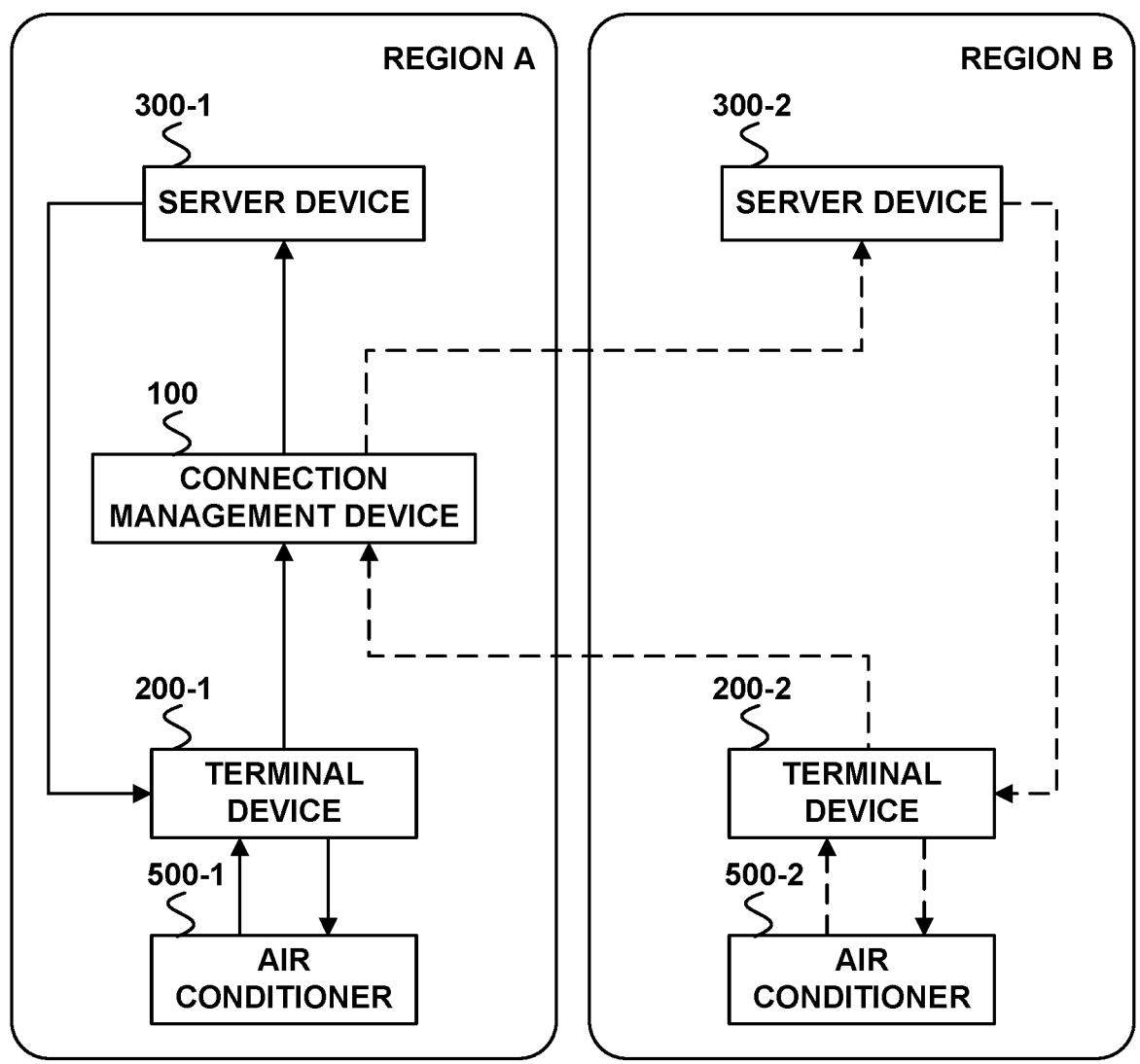
FIG. 4 is a diagram illustrating a connection topology of the connection management device, the terminal device, and the server device according to Embodiment 1.

In FIG. 4, the connection management device 100, the terminal device 200-1, the server device 300-1, and the air conditioner 500-1 exist in a region A, and the terminal device 200-2, the server device 300-2, and the air conditioner 500-2 exist in a region B. The region indicates a country, a state, a municipality, or the like. In FIG. 4, a solid line indicates connection between the devices made upon request for connection from the terminal device 200-1 and a dashed line indicates connection between the devices made upon request for connection from the terminal device 200-2.

Since the laws and regulations about processing of data are generally defined for each region, the connection management device 100 of the present embodiment manages the connections between the terminal device 200 and the server device 300 so that data transfer and storage are performed in the same region.

For example, upon initial start of an application after installation in the terminal device 200-1 existing in the region A, a request for connection to the server device 300 is transmitted to the connection management device 100. The connection management device 100 determines that the server device 300-1 existing in the same region A as the terminal device 200-1 is the server device 300 to which the terminal device 200-1 is to connect, and transmits to the server device 300-1 the request for connection from the terminal device 200-1. The server device 300-1 transmits to the terminal device 200-1 a response including identification information for identifying the server device 300-1. The terminal device 200-1 having received the response communicates directly with the server device 300-1 using the identification information and establishes connection with the server device 300-1.

After establishment of the connection, the terminal device 200-1 receives from the server device 300-1 control information for automatic control of the air conditioner 500-1, and transmits the control information to the air conditioner 500-1. A setting temperature, a setting air volume, and the like of the air conditioner 500-1 are set based on the control information. The air conditioner 500-1 transmits to the terminal device 200-1 a setting completion notification, an operation change notification, a notification of power consumption of the air conditioner 500-1, and the like. The terminal device 200-1 transmits to the server device 300-1 the notification received from the air conditioner 500-1.

Upon initial start of an application after installation in the terminal device 200-2 existing in the region B, a request for connection to the server device 300 is transmitted to the connection management device 100. The connection management device 100 determines that the server device 300-2 existing in the same region B as the terminal device 200-2 is the server device 300 to which the terminal device 200-2 is to connect, and transmits to the server device 300-2 the request for connection from the terminal device 200-2. The server device 300-2 transmits to the terminal device 200-2 a response including identification information for identifying the server device 300-2. The terminal device 200-2 having received the response communicates directly with the server device 300-2 using the identification information and establishes connection with the server device 300-2.

After establishment of the connection, the terminal device 200-2 receives from the server device 300-2 control information for automatic control of the air conditioner 500-2, and transmits the control information to the air conditioner 500-2. A setting temperature, a setting air volume, and the like of the air conditioner 500-2 are set based on the control information. The air conditioner 500-2 transmits to the terminal device 200-2 a setting completion notification, an operation change notification, a notification of power consumption of the air conditioner 500-2, and the like. The terminal device 200-2 transmits to the server device 300-2 the notification received from the air conditioner 500-2.

Figure 5:
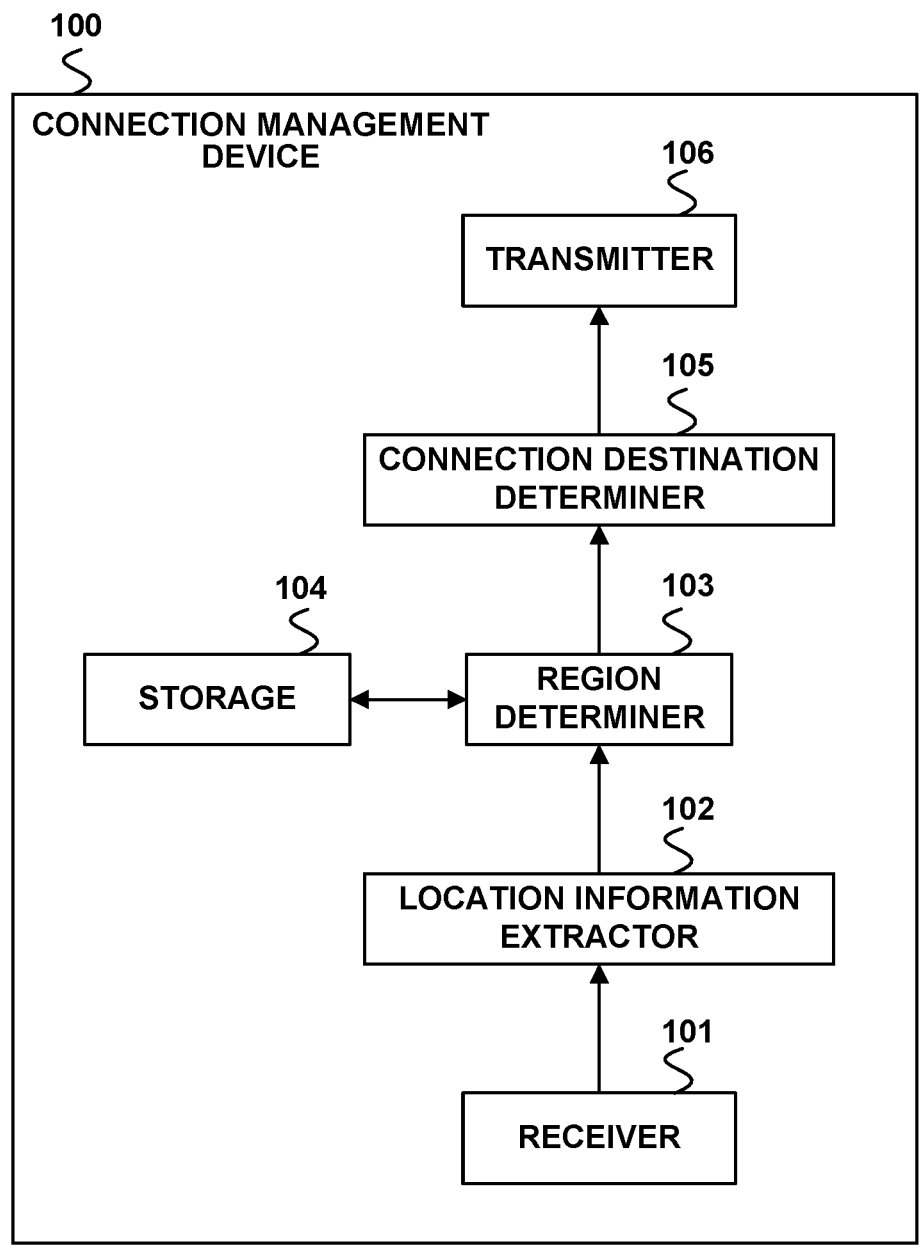
FIG. 5 is a block diagram illustrating a functional configuration of the connection management device according to Embodiment 1.

Next, functions of the connection management device 100 are described with reference to FIG. 5. The connection management device 100 includes a receiver 101 that receives from the terminal device 200 a request for connection, a location information extractor 102 that extracts location information of the terminal device 200 from the request for connection, a region determiner 103 that determines a region of the terminal device 200 based on the extracted location information, a storage 104 that stores data that is the location information and the regional information associated with each other, a connection destination determiner 105 that determines, based on the determined region, a server device 300 to be connected to, and a transmitter 106 that transmits to the determined server device 300 the request for connection.

The receiver 101 receives from the terminal device 200 the request for connection to the server device 300. The receiver 101 is implemented by cooperation of the processor 11 with the network interface 15. Here, the receiver 101 is an example of reception means and second reception means.

Upon initial start of the application after installation in the terminal device 200, the request for connection to the server device 300 is transmitted to the connection management device 100, and the receiver 101 receives from the terminal device 200 the request for connection.

The request for connection received from the terminal device 200 is not for requesting connection to a particular server device 300 but for requesting connection to any of the server devices 300 that provides services. Thus the request for connection does not include identification information for identifying the server device 300. The request for connection does not also include information for identifying a user of the terminal device 200.

The request for connection includes location information indicating a location where the terminal device 200 exists. The location information is information indicating a location of the terminal device 200, such as latitude and longitude, an Internet Protocol (IP) address, or the like.

The latitude and longitude are latitude and longitude of the terminal device 200 determined by the GPS module 26 of the terminal device 200 or latitude and longitude indicating a location of a base station to which the terminal device 200 is connected.

The IP address is a global IP address used by the terminal device 200. The country-by-country allocation of global IP addresses is publicly known, and the country where the terminal device 200 exists can be known by reference to the global IP address.

The request for connection includes at least one piece of information of latitude and longitude of the terminal device 200, latitude and longitude of the location of the base station to which the terminal device 200 is connected, and the global IP address. The request for connection also includes identification information for identifying the terminal device 200 to receive a response from the server device 300 as described later.

The location information extractor 102 extracts, from the request for connection, location information indicating a location where the terminal device 200 exists. The location information extractor 102 is implemented by the processor 11. The location information extractor 102 is an example of location information extraction means.

For example, the location information extractor 102 extracts, from the request for connection, latitude and longitude indicating a location of the terminal device 200 or a location of the base station. Alternatively, the location information extractor 102 extracts, from the request for connection, a global IP address that the terminal device 200 uses.

The region determiner 103 determines, based on the extracted location information, a region where the terminal device 200 exists. The region determiner 103 determines the region by reference to the data stored in the storage 104. The region determiner 103 is implemented by the processor 11. The region determiner 103 is an example of region determination means.

The storage 104 stores, in association with each other, regional information indicating a region and location information. For example, the storage 104 stores, in association with each other, regional information data that is data of the regional information and the latitude and longitude. FIG. 6 illustrates an example of the regional information data that is data of the regional information and the latitude and longitude associated with each other. The regional information data illustrated in FIG. 6 is stored in the memory 14.

In the table in FIG. 6, the region is associated with the latitudes and longitudes of the easternmost point, the westernmost point, the southernmost point, and northernmost point of the region. The data in the first row of the table in FIG. 6 indicates that the latitudes of the region "A" are "2416.5993, N" at the easternmost point, "2426.5812, N" at the westernmost point, "2025.3101, N" at the southernmost point, and "4533.2622, N" at the northernmost point.

The storage 104 stores regional information data that are data of the regional information and the global IP address associated with each other. FIG. 7 illustrates an example of the regional information data of the regional information and the global IP address associated with each other. The regional information data illustrated in FIG. 7 is also stored in the memory 14.

In the table in FIG. 7, the region is associated with the global IP address. The data in the first row of the table in FIG. 7 indicates that the region "A" is assigned addresses, "1.0.16.0-1.0.31.255, 1.0.64.0-1.0.127.255" and the like.

For example, when the extracted location information has a latitude "3541.1493, N" and a longitude "13945.3994, E", the region determiner 103 identifies a region that includes the latitude "3541.1493, N" and the longitude "13945.3994, E" by reference to the table in FIG. 6. Since the latitude "3541.1493, N" and the longitude "13945.3994, E" are values included in the "region A", the region determiner 103 determines that the "region A" is the region where the terminal device 200 exists.

When the extracted location information has an IP address "1.0.16.1", the region determiner 103 determines, by reference to the table in FIG. 7, that the "region A" assigned the IP address "1.0.16.1" is the region where the terminal device 200 exists.

When multiple types of location information are included, the region determiner 103 determines the region based on each type of location information. When different regions are determined, the region determiner 103 may determine the region based on a predetermined adoption priority of location information.

The connection destination determiner 105 determines, based on the determined region, the server device 300 to which the terminal device 200 is to connect. The connection destination determiner 105 is implemented by the processor 11. The connection destination determiner 105 is an example of connection destination determination means.

Here, the server device 300 to which the terminal device 200 is to connect refers to a secure server device 300 that can avoid a risk of non-compliance with laws and regulations on processing of data acquired from the terminal device 200. Since the laws and regulations are generally defined for each region, the data acquired from the terminal device 200 can be considered to be secure in a situation where the server device 300 in the same region processes the data. Thus, in the present embodiment, the connection destination determiner 105 recognizes that the server device 300 existing in the same region as the terminal device 200 is the server device 300 that avoids a risk of non-compliance with the laws and regulations on processing of data acquired from the terminal device 200, and determines that the server device 300 existing in the same region as the terminal device 200 is the server device 300 to which the terminal device 200 is to connect.

For example, in a case where the receiver 101 receives a request for connection from the terminal device 200-1, the connection destination determiner 105 determines that, among the server devices 300-1, 300-2, . . . , 300-n, the server device 300-1 existing in the same region A as the terminal device 200-1 is the server device 300 to which the terminal device 200-1 is to connect.

The transmitter 106 transmits, to the determined server device 300, the request for connection received from the terminal device 200. The transmitter 106 is implemented by cooperation of the processor 11 with the network interface 15. The transmitter 106 is an example of transmission means and a second transmission means.

For example, the transmitter 106 transmits to the server device 300-1 the request for connection received from the terminal device 200-1.

Figure 8:
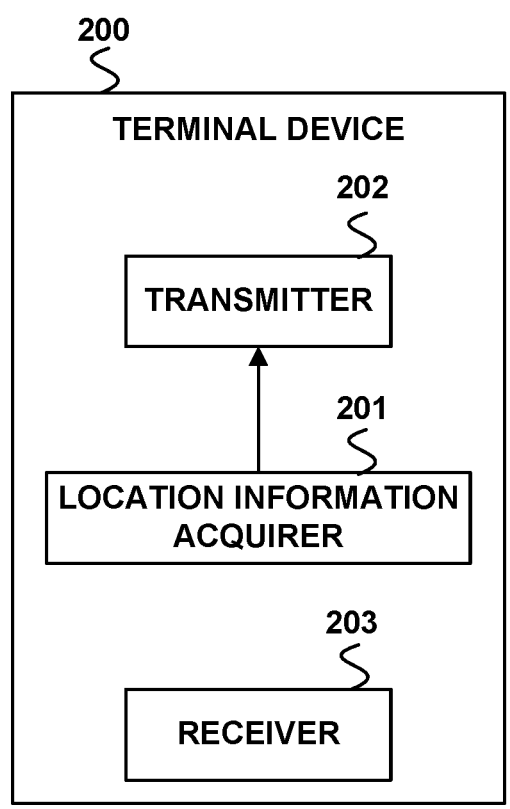
FIG. 8 is a block diagram illustrating a functional configuration of the terminal device according to Embodiment 1.

Next, functions of the terminal device 200 are described with reference to FIG. 8. The terminal device 200 includes a location information acquirer 201 that acquires location information of the terminal device 200, a transmitter 202 that transmits a request for connection to the server device 300, and a receiver 203 that receives a response from the server device 300. The terminal device 200 is assumed to have an installed application for operation of an air conditioner.

The location information acquirer 201 acquires location information that indicates a location where the terminal device 200 exists. The location information acquirer 201 is implemented by cooperation of the processor 21 with the network interface 25 and the GPS module 26. The location information acquirer 201 is an example of location information acquisition means.

Upon initial start of the application for operation of the air conditioner after installation in the terminal device 200, the location information acquirer 201 acquires latitude and longitude that indicates a location where the terminal device 200 exists. For example, upon receiving a sentence "$GPRMC,085120.307,A,3541.1493,N,13945.3994,E, 000.0,240.3,181211,,,A*6A" from the GPS module 26, the location information acquirer 201 acquires the latitude "3541.1493, N" and the longitude "13945.3994, E" from the sentence.

Alternatively, the location information acquirer 201 may acquire the latitude and longitude of the base station to which the terminal device 200 is connected. In a case where the terminal device 200 exists in a cell covered by the base station, the base station notifies the latitude and longitude of the base station to the terminal device 200, and thus the location information acquirer 201 acquires the notified latitude and longitude of the base station.

The location information acquirer 201 may acquire the global IP address used by the terminal device 200.

The location information acquirer 201 may calculate, based on information from the GPS satellite and information from the base station, the latitude and longitude where the terminal device 200 exists.

In a case where the user allows finding of the location information from his or her address registered in the terminal device 200, the location information acquirer 201 may find the location information of the terminal device 200 from the user's address registered in the terminal device 200. The location information acquirer 201 may find the location information about the location where the terminal device 200 exists by communicating with a device other than the terminal device 200.

An administrator of the connection management device 100 can freely select, as the location information, any of the aforementioned location information such as the latitude and longitude, the global IP address, and the like or a combination thereof.

The transmitter 202 transmits the request for connection to the server device 300, including the acquired location information. The transmitter 202 is implemented by cooperation of the processor 21 with the network interface 25. The transmitter 202 is an example of first transmission means.

For example, the transmitter 202 of the terminal device 200-1 transmits to the connection management device 100 the request for connection including the location information that are the latitude "3541.1493, N" and the longitude "13945.3994, E".

The terminal device 200 includes, in the request for connection, the identification information for identifying the terminal device 200 to receive a response from the server device 300. The identification information of the terminal device 200 is information in which the user of the terminal device 200 is not identified. For example, upon initial start of an application after installation, the application generates one-time usable identification information to receive a response from the server device 300. This identification information is discarded upon the terminal device 200 receiving the response from the server device 300.

The receiver 203 receives from the server device 300 the response to the request for connection. The receiver 203 is implemented by cooperation of the processor 21 with the network interface 25. The receiver 203 is an example of first reception means.

The response includes the identification information of the server device 300 determined by the connection management device 100 as the server device 300 to be connected to. The terminal device 200 establishes connection with the server device 300 based on this identification information. After establishment of the connection, sending and receiving of data necessary for the user of the terminal device 200 to receive services is started between the terminal device 200 and the server device 300.

For example, the receiver 203 of the terminal device 200-1 receives, from the server device 300-1 determined by the connection management device 100 as a connection destination of the terminal device 200-1, the response including the identification information for identifying the server device 300-1. Using this identification information, the terminal device 200-1 establishes the connection to the server device 300-1. After establishment of the connection to the server device 300-1, the receiver 203 of the terminal device 200-1 receives from the server device 300-1 control information for automatic control of the air conditioner 500-1.

Figure 9:
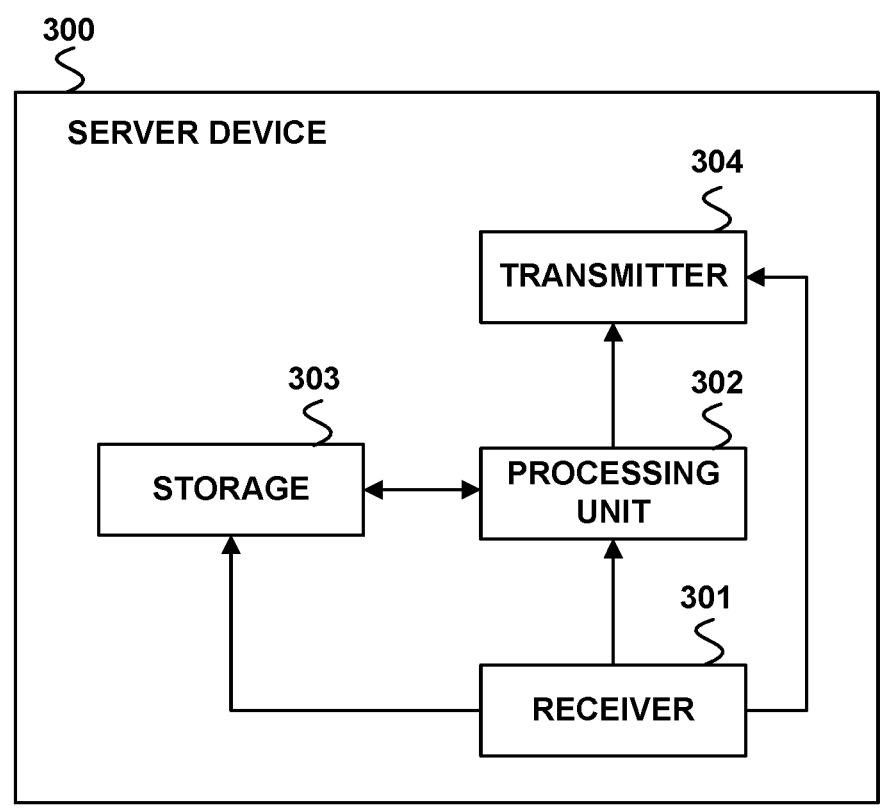
FIG. 9 is a block diagram illustrating a functional configuration of the server device according to Embodiment 1.

Next, functions of the server device 300 are described with reference to FIG. 9. The server device 300 includes a receiver 301 that receives a request for connection, a processing unit 302 that performs processing for providing services, a storage 303 that stores information associated with the user of the terminal device 200, and a transmitter 304 that transmits to the terminal device 200 a response.

The receiver 301 receives, from the connection management device 100, the request for connection transmitted by the terminal device 200. The receiver 301 is implemented by cooperation of the processor 11 with the network interface 15. The receiver 301 is an example of third reception means.

For example, the receiver 301 of the server device 300-1 receives from the connection management device 100 the request for connection transmitted by the terminal device 200-1.

After establishment of connection between the terminal device 200 and the server device 300, the receiver 301 receives from the terminal device 200 data necessary for providing services. For example, the terminal device 200 transmits to the server device 300 personal information data including personal information and an operation history of the air conditioner. Here, the personal information is information with which, alone or in combination, an individual can be identified. Examples of the personal information include a name, address, email address, phone number, sex, and age.

The processing unit 302 performs, by reference to the data stored in the storage 303, various types of processing for the server device 300 to provide services.

The processing unit 302 is implemented by the processor 11.

Specifically, the processing unit 302 generates control information of the air conditioner based on the data stored in the storage 303.

The storage 303 stores the data transmitted by the terminal device 200.

FIG. 10 illustrates an example of data stored in the storage 303. The personal information data illustrated in FIG. 10 is stored in the memory 14. The personal information data is data generated for the user of the terminal device 200 after establishment of secure connection between the terminal device 200 and the server device 300.

The table in FIG. 10 includes an identification (ID) assigned to the user of the terminal device 200, name, address, email address, sex, and age of the user, and operation history of the air conditioner. The operation history includes an operation time that is a time when the user operates the air conditioner and a set temperature. The operation history is transmitted by the terminal device 200 every time the user operates the air conditioner using the application or is transmitted periodically.

After establishment of the connection to the terminal device 200, the processing unit 302 generates, by reference to the personal information data of FIG. 10, control information for automatic control of the air conditioner.

The transmitter 304 transmits, to the terminal device 200 having transmitted the request for connection, the response including the identification information for identifying the server device 300. The transmitter 304 is implemented by cooperation of the processor 11 with the network interface 15. The transmitter 304 is an example of third transmission means.

For example, the server device 300-1 having received the request for connection of the terminal device 200-1 transmits to the terminal device 200-1 the response including the identification information of the server device 300-1 using the one-time identification information of the terminal device 200-1 included in the request for connection.

After establishment of the connection between the terminal device 200 and the server device 300, the transmitter 304 transmits to the terminal device 200 the data necessary for providing services. For example, the transmitter 304 transmits the control information of the air conditioner 500-1 to the terminal device 200-1.

Figure 11:
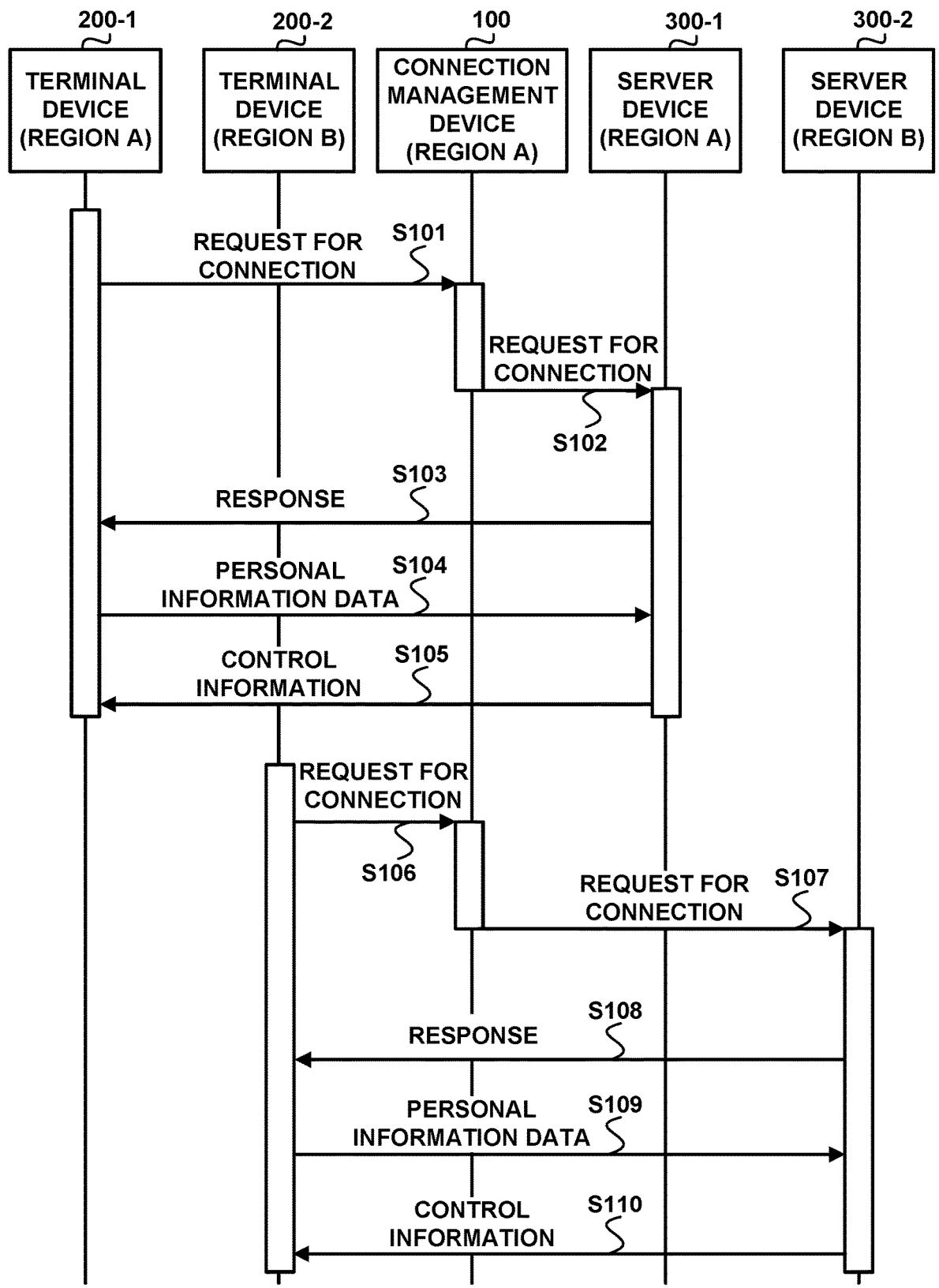
FIG. 11 is a sequence diagram illustrating a flow of process steps executed among the connection management device, the terminal device, and the server device according to Embodiment 1.

Next, an operation of the connection management system 1 according to the present embodiment is described. FIG. 11 is a sequence diagram illustrating a flow of process steps executed among the connection management device 100, the terminal device 200, and the server device 300. The sequence diagram in FIG. 11 indicates a flow of process steps in a case of the connection topology in FIG. 4.

Upon the terminal device 200-1 in the region A transmitting the request for connection (step S101), the connection management device 100 executes a connection management process described later, and transmits, to the server device 300-1 in the region A determined as the connection destination of the terminal device 200-1, the request for connection (step S102). Upon the server device 300-1 transmitting the response including the identification information of the server device 300-1 to the terminal device 200-1 (step S103), the terminal device 200-1 transmits the personal information data to the server device 300-1 using the received identification information (step S104). The server device 300-1 generates the control information based on the personal information data stored in the storage 303 and transmits the control information to the terminal device 200-1 (step S105).

Upon the terminal device 200-2 in the region B transmitting the request for connection (step S106), the connection management device 100 executes the connection management process described later, and transmits, to the server device 300-2 in the region B determined as the connection destination of the terminal device 200-2, the request for connection (step S107). Upon the server device 300-2 transmitting the response including the identification information of the server device 300-2 (step S108), the terminal device 200-2 transmits the personal information data to the server device 300-2 using the received identification information (step S109). The server device 300-2 generates the control information based on the personal information data stored in the storage 303 and transmits the control information to the terminal device 200-2 (step S110).

Figure 12:
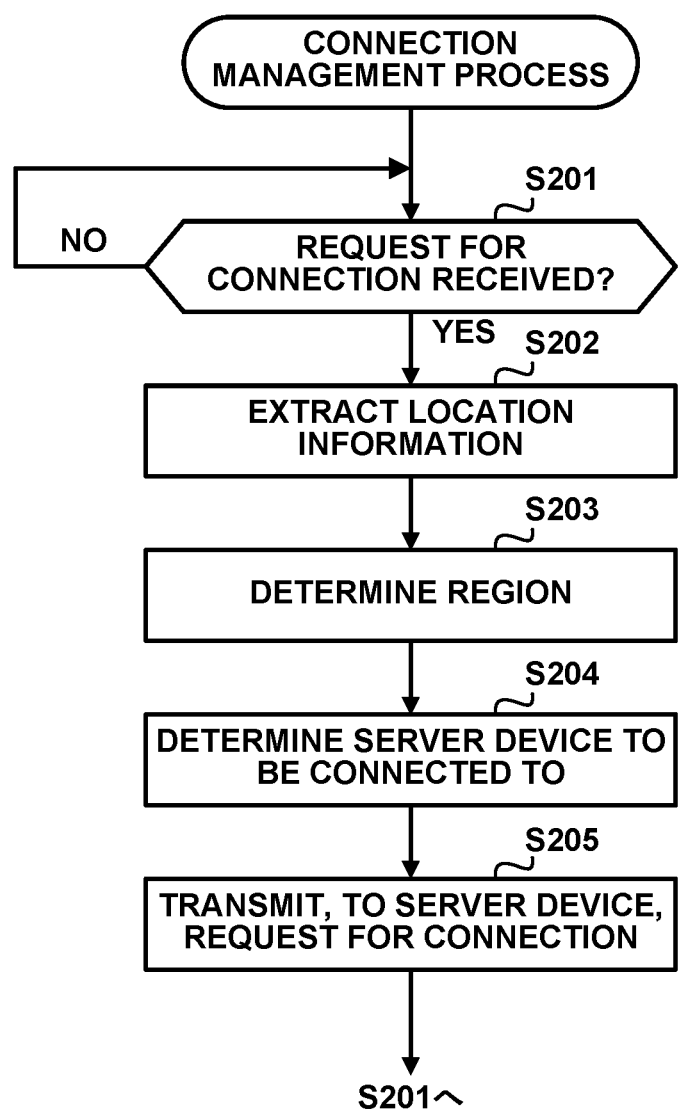
FIG. 12 is a flowchart illustrating a connection management process executed by the connection management device according to Embodiment 1.

Next, the connection management process executed by the connection management device 100 according to the present embodiment is described using the flowchart of FIG. 12. Upon turn-on of the connection management device 100, the connection management process illustrated in FIG. 12 starts.

The receiver 101 determines whether or not the receiver 101 receives from the terminal device 200 the request for connection (step S201). Specifically, the receiver 101 determines whether or not the receiver 101 receives the request for connection transmitted upon initial start of the application after installation in the terminal device 200.

Upon the receiver 101 determining that the receiver 101 receives the request for connection from the terminal device 200 (yes in step S201), the location information extractor 102 then extracts the location information of the terminal device 200 from the request for connection (step S202). Specifically, the location information extractor 102 extracts the latitude and longitude or the global IP address included in the request for connection. Upon the receiver 101 determining that the receiver 101 does not receive the request for connection from the terminal device 200 (no in step S201), the receiver 101 remains on standby.

In step S202, upon extraction of the location information, the region determiner 103 determines the region associated with the location information by reference to the regional information data stored in the storage 104 (step S203). The connection destination determiner 105 determines, based on the determined region, the server device 300 to be connected to (step S204). Specifically, the connection destination determiner 105 determines that the server device 300 existing in the same region as the terminal device 200 having transmitted the request for connection is the server device 300 to which the terminal device 200 is to connect. The transmitter 106 transmits, to the determined server device 300, the request for connection (step S205).

With the globalization of services, the same application may be used in the terminal devices in different regions across borders. In such circumstances, the server device may not be able to identify the region where the terminal device performing communication exists. However, according to the connection management device according to the present embodiment, the region of the terminal device on which the application runs can be determined automatically without user's input. The connection management device according to the present embodiment can determine, based on the determined region, the server device that can avoid a risk of non-compliance with the laws and regulations on processing of data of the terminal device and may connect the terminal device automatically to the determined secure server device. This can achieve compliance with the laws and regulations.

Security standards on processing of data are different for different regions. Providing the server device in each region that provides services so as to satisfy the strictest security standards in the regions is technically difficult and costly. In addition, since the laws and regulations are updated independently in each region, providing the server device in each region so as to comply with all the laws and regulations is troublesome and difficult from the management perspective. Thus the server device in each region is preferably managed by a service provider in each region, an administrator of a service providing country, or the like so as to comply with the laws and regulations in each region and satisfy the security standards in each region. According to the present embodiment, since the data stored in the server device is data acquired from the terminal device existing in the same region as the data stored in the server device, the administrator can perform management so as to satisfy the laws and regulations and the security standards in the administrator's own region without worrying about the other region's laws and regulations and security standards in the other regions.

According to the present embodiment, since the data including user's personal information is transmitted by the terminal device after establishment of the connection of the terminal device to the server device that can avoid a risk of non-compliance with the laws and regulations on processing of data, before the establishment of the connection to the secure server device, user's personal information can be prevented from being leaked to the outside of the region that is non-compliant with the laws and regulations.

Embodiment 2

The server device according to Embodiment 2 includes functions of the connection management device according to Embodiment 1.

Figure 13:
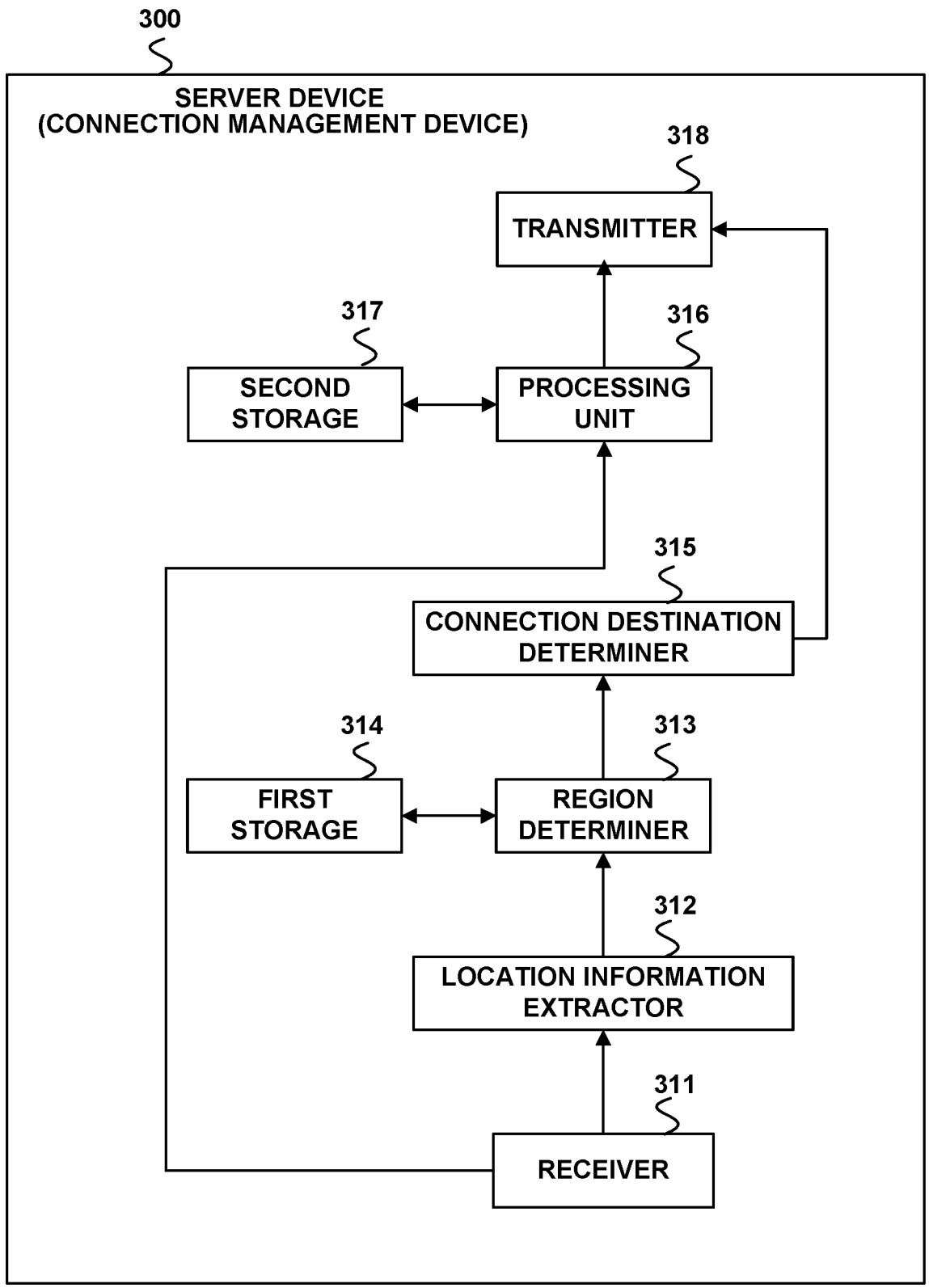
FIG. 13 is a block diagram illustrating a functional configuration of a server device according to Embodiment 2.

As illustrated in FIG. 13, a server device 300 according to Embodiment 2 includes a receiver 311 that receives from a terminal device 200 a request for connection, a location information extractor 312 that extracts, from the request for connection, location information of the terminal device 200, a region determiner 313 that determines, based on the extracted location information, a region of the terminal device 200, a first storage 314 that stores data that is location information and regional information associated with each other, a connection destination determiner 315 that determines, based on the determined region, the server device 300 to be connected to, a processing unit 316 that performs processing for providing services, a second storage 317 that stores information associated with a user of the terminal device 200, and a transmitter 318 that transmits to the terminal device 200 a response.

The receiver 311 has the functions of the receiver 101 of the connection management device 100 of Embodiment 1. After establishment of connection between the terminal device 200 and the server device 300, the receiver 311 receives from the terminal device 200 data necessary for providing services.

The location information extractor 312, the region determiner 313, the first storage 314, the connection destination determiner 315, the processing unit 316, and the second storage 317 have the same functions as the location information extractor 102, the region determiner 103, the storage 104, the connection destination determiner 105, the processing unit 302, and the storage 303 of Embodiment 1, respectively.

The transmitter 318 transmits, to the terminal device 200 having transmitted a request for connection, a response including identification information for identifying the server device 300 of the transmitter 318, in a case where the server device 300 determined by the connection destination determiner 315 is the server device 300 of the transmitter 318. In a case where the server device 300 determined by the connection destination determiner 315 is another server device 300, the transmitter 318 transmits the request for connection received from the terminal device 200 to the determined another server device 300. The transmitter 318 transmits to the terminal device 200 the data necessary for providing services after establishment of the connection between the terminal device 200 and the server device 300.

Figure 14:
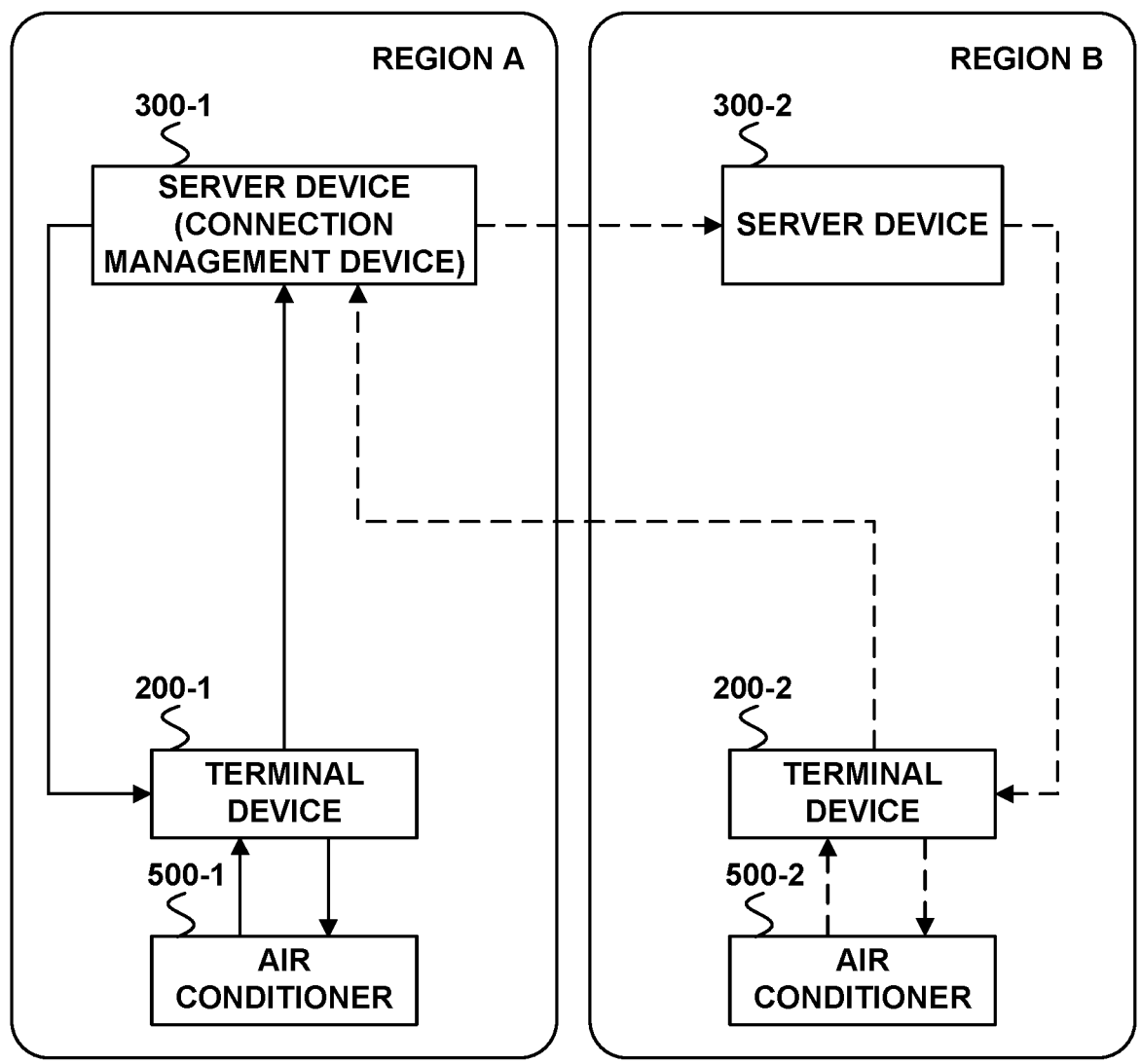
FIG. 14 is a diagram illustrating a connection topology of a terminal device and the server device according to Embodiment 2.

A connection topology of the terminal device 200 and the server device 300 in a case where an application of the terminal device 200 is initially started after installation is described with reference to FIG. 14. In FIG. 14, the terminal device 200-1, the server device 300-1, and the air conditioner 500-1 exist in the region A, and the terminal device 200-2, the server device 300-2, and the air conditioner 500-2 exist in the region B. The server device 300-1 existing in the region A is assumed to have functions of the connection management device 100.

For example, upon initial start of an application after installation in the terminal device 200-1 existing in the region A, a request for connection to the server device 300 is transmitted to the server device 300-1. The server device 300-1 determines that the server device 300-1 itself in the same region A as the terminal device 200-1 is the server device 300 to which the terminal device 200-1 is to connect, and transmits to the terminal device 200-1 the response including the identification information of the server device 300-1.

Upon initial start of an application after installation in the terminal device 200-2 existing in the region B, a request for connection to the server device 300 is transmitted to the server device 300-1. The server device 300-1 determines that the server device 300-2 in the same region B as the terminal device 200-2 is the server device 300 to which the terminal device 200-2 is to connect, and transmits to the server device 300-2 the request for connection of the terminal device 200-2. The server device 300-2 transmits to the terminal device 200-2 the response including the identification information for identifying the server device 300-2.

The server device 300 according to the present embodiment can, due to the aforementioned configuration and operation, exhibit similar effects those of the connection management device 100 according to Embodiment 1.

Modified Example

Although the embodiments of the present disclosure have been described, modifications and applications in various forms can be made to implement the present disclosure.

Although, in the above embodiments, the server device 300 includes a function of providing services and a function of storing information associated with a user of the terminal device 200, the configuration is not limited thereto and may be implemented by another device with each function.

Figure 15:
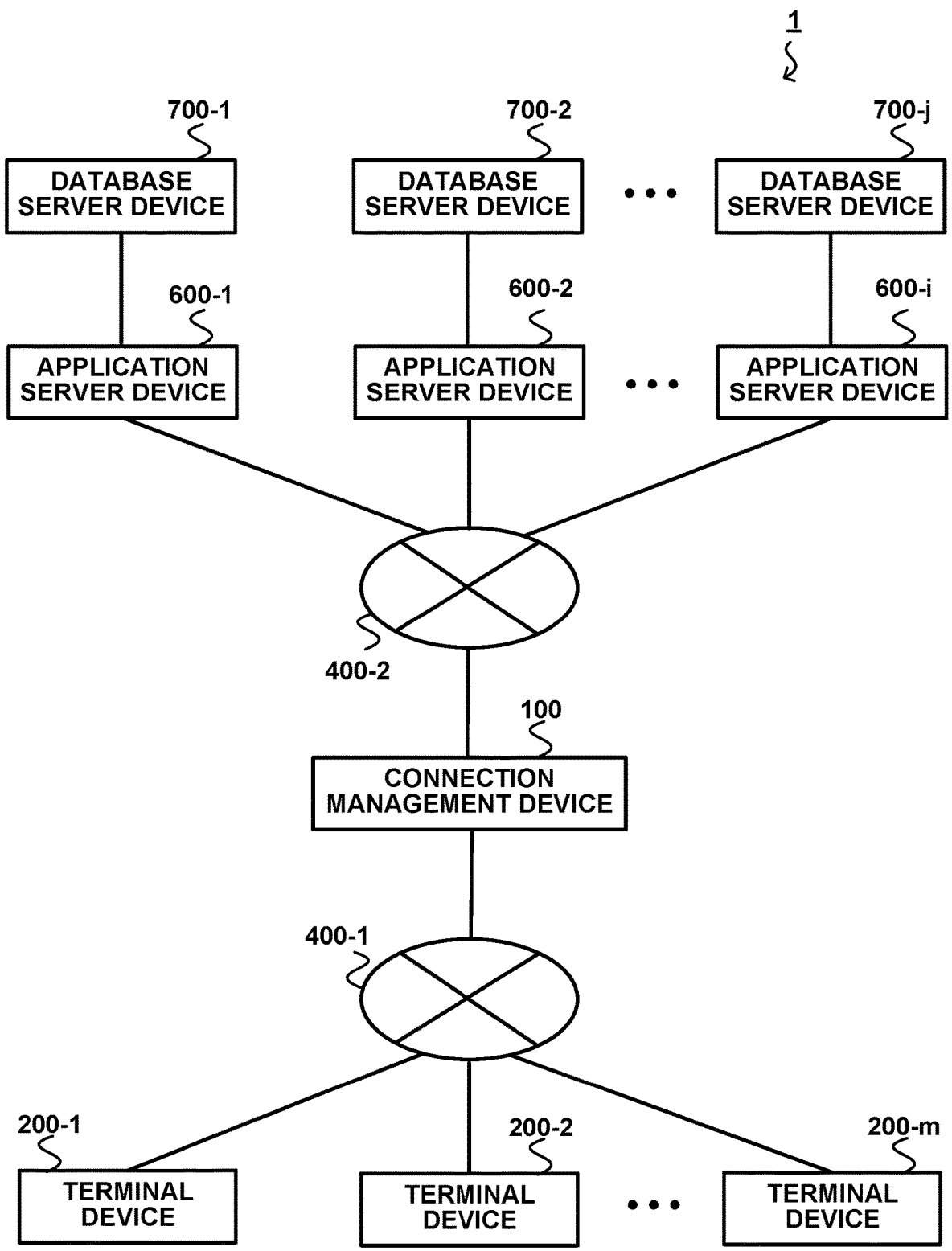
FIG. 15 is a block diagram illustrating an overall configuration of a connection management system according to a modified example.

For example, as illustrated in FIG. 15, the connection management system 1 includes the connection management device 100, the terminal devices 200-1, 200-2, . . . , 200-m (m is a natural number not less than 2), application server devices 600-1, 600-2, . . . , 600-i (i is a natural number not less than 2), and database server devices 700-1, 700-2, . . . , 700-j (j is a natural number not less than 2). The application server devices 600-1, 600-2, . . . 600-i are collectively referred to as an application server device 600, and the database server devices 700-1, 700-2, . . . , 700-j are collectively referred to as a database server device 700. The application server device 600 may have functions of the receiver 301, the processing unit 302, and the transmitter 304, and the database server device 700 may have functions of the storage 303.

Figure 16:
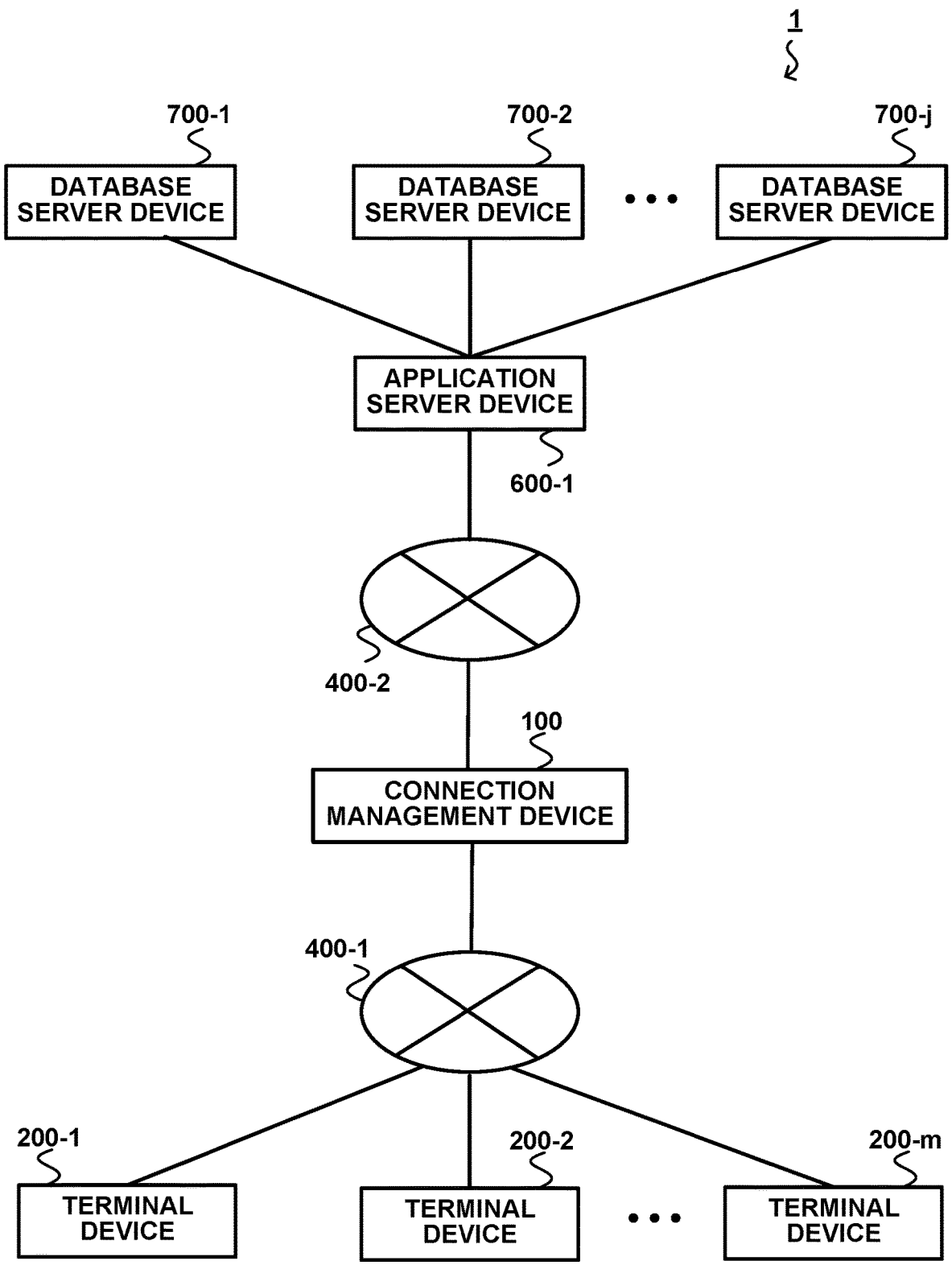
FIG. 16 is a block diagram illustrating an overall configuration of a connection management system according to a modified example.

For example, as illustrated in FIG. 16, the connection management system 1 may include the connection management device 100, the terminal devices 200-1, 200-1, . . . , 200-m (m is a natural number not less than 2), the application server device 600-1, and the database server devices 700-1, 700-2, . . . , 700-j (j is a natural number not less than 2). In this case, only the database server devices 700 are placed in mutually different regions.

Figure 17:
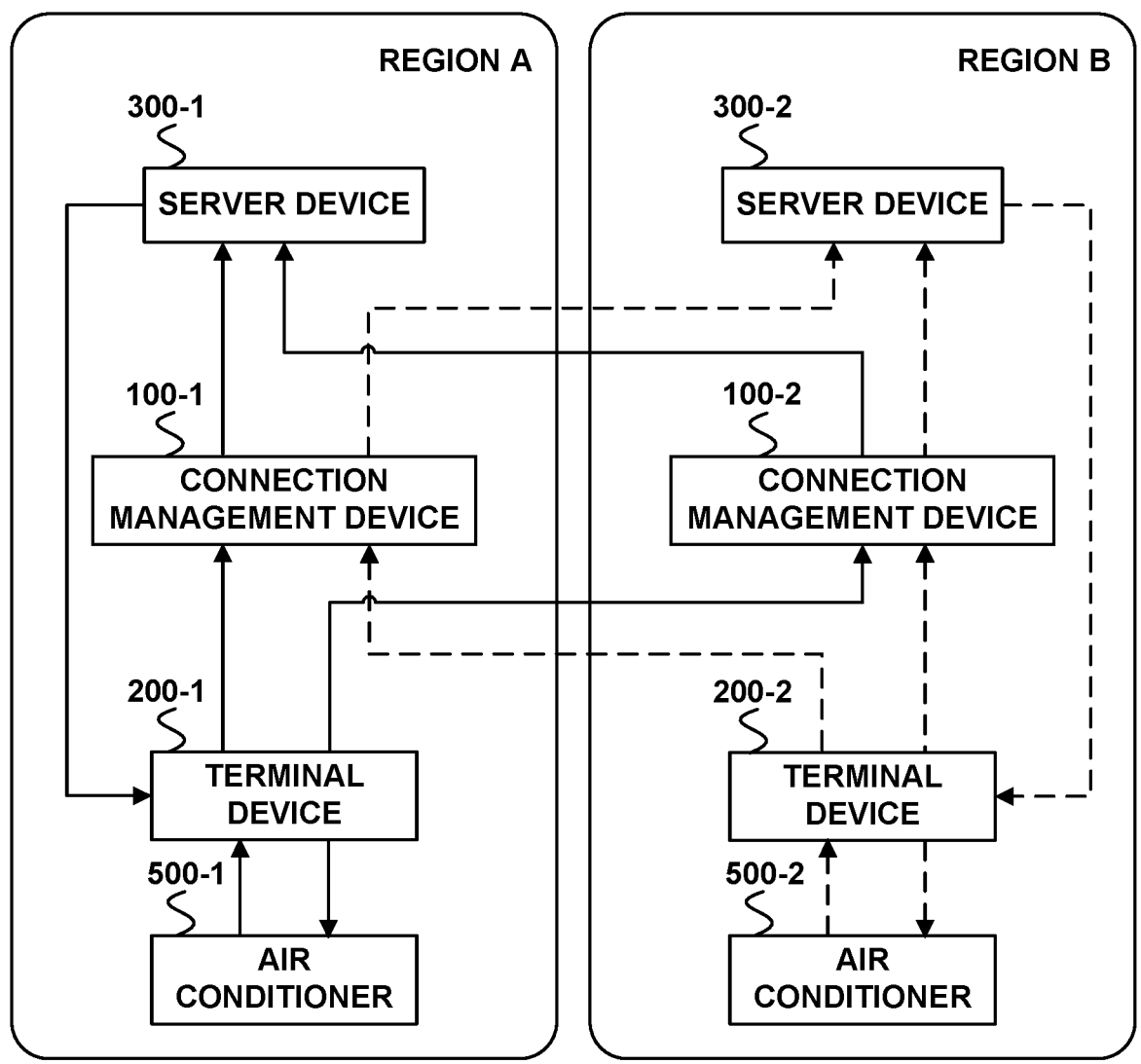
FIG. 17 is a diagram illustrating a connection topology of a connection management device, a terminal device, and a server device according to a modified example.

The connection management system 1 of Embodiment 1 may have a plurality of connection management devices 100. Also, one or more connection management device 100 may be arranged to exist in each region. For example, as illustrated in FIG. 17, the connection management device 100-1 may exist in the region A and the connection management device 100-2 may exist in the region B.

When normally operating, the terminal device 200-2 existing in the region B transmits, to the connection management device 100-2 existing in the same region B, the request for connection. However, in a case where the applications running in the terminal devices 200 in each region are common, for example, the terminal device 200-2 may transmit, to the connection management device 100-1 existing in the region A, the request for connection for some reasons. In such a case, upon receiving from the terminal device 200-2 existing in the region B the request for connection, the connection management device 100-1 transmits to the server device 300-2 existing in the region B the received request for connection. Similarly, when the request for connection is transmitted from the terminal device 200-1 existing in the region A to the connection management device 100-2 existing in the region B, the connection management device 100-2 transmits to the server device 300-1 existing in the region A the request for connection of the terminal device 200-1.

The terminal device 200 may be arranged to connect to the connection management device 100 existing in the same region after connecting to the connection management device 100 existing in another region and then receiving the response from the server device 300 existing in the same region. For example, after transmitting to the connection management device 100-1 existing in the region A the request for connection and then receiving the response from the server device 300-2 existing in the region B, the terminal device 200-2 may transmit to the connection management device 100-2 existing in the region B the request for connection again.

Although, in FIGS. 4 and 11 of Embodiment 1, the connection management device 100 is assumed to exist in the region A, the arrangement is not limited thereto and the connection management device 100 may exist in the region B. In this case, the connection management device 100 existing in the region B transmits to the server device 300-1 existing in the region A the request for connection from the terminal device 200-1 existing in the region A, and transmits to the server device 300-2 existing in the region B the request for connection from the terminal device 200-2 existing in the region B. Alternatively, the connection management device 100 may exist in another region different from the regions A and B. In the case too, the connection management device 100 transmits to the server device 300 the request for connection based on the region of the terminal device 200.

Although, in Embodiment 2, only the server device 300-1 existing in the region A has the functions of the connection management device 100, the configuration is not limited thereto. The server device 300-2 in the region B may have the functions of the connection management device 100 or both of the server devices 300-1 and 300-2 may have the functions of the connection management device 100.

Although, in the above embodiments, the connection destination determiner 105 determines that the server device 300 existing in the same region as the terminal device 200 is the server device 300 to which the terminal device is to connect, such configuration is not limiting. The connection destination determiner 105 can determine, as the server device 300 to be connected to, any server device that can avoid a risk of non-compliance with the laws and regulations. For example, in a case where the laws and regulations in the region where the terminal device 200 exits allows transfer and storage of data in a particular region that is different from the region where the terminal device 200 exists, the server device 300 existing in the particular region may be included in the server devices 300 to be connected to. The connection destination determiner 105 may determine the server device 300 to be connected to, based on not only the laws and regulations but also a contract in each region.

Although, in Embodiment 1, the regional information data in FIGS. 6 and 7 are assumed to be stored in the storage 104 of the connection management device 100, such configuration is not limiting. The types of regional information data to be stored in the storage 104 may be determined in accordance with the location information acquired by the terminal device 200. For example, in a case where the location information acquired by the terminal device 200 is only latitude and longitude, storage of only the regional information data in FIG. 6 by the storage 104 is permissible.

Although, in the above embodiments, the server device 300 included in the connection management system 1 is assumed to provide services of automatic control of an air conditioner, such configuration is not limiting. For example, the server device 300 may provide services for control of various devices and systems, such as an illumination device, home appliances such as a refrigerator, a hot-water supply system, a ventilation system, and the like. The server device 300 may be any server device 300 that can transmit and receive data to and from the terminal device 200, without being a device that provides services. For example, the server device 300 may manage personal data transmitted by the terminal device 200.

Although, in Embodiment 1, the connection management device 100 and the terminal device 200 in FIG. 1 are connected to the network 400-1 and the connection management device 100 and the server device 300 are connected to the network 400-2, such configuration is not limiting. The connection management device 100, the terminal device 200, and the server device 300 may be connected to the same network.

By applying an operation program defining an operation of the connection management device 100 according to Embodiment 1 to an existing personal computer or an information terminal device, the personal computer or the information terminal device can be made to function as the connection management device 100 according to Embodiment 1.

Any method for distribution of such a program can be adopted. For example, the program may be stored and distributed on a computer-readable recording medium such as a compact disk read-only memory (CD-ROM), a digital versatile disk (DVD), a memory card, or may be distributed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can provide a connection management device, a connection management system, a connection management method, and a program that are capable of automatic connection of a terminal device to a secure server that avoids a risk of non-compliance with laws and regulations.

The invention claimed is:

1. A connection management device capable of communicating with a plurality of servers, the connection management device comprising:
a processor coupled to a memory, the processor being configured to
receive from a terminal a request for connection to one of the plurality of servers, the request for connection including location information acquired when the terminal transmits the request for connection and indicating a location where the terminal exists;

extract the location information from the request for connection;
determine, based on the location information extracted by the processor, a region where the terminal exists;
determine, based on the region determined by the processor, which of the plurality of servers is the server to which the terminal is to connect, wherein the processor determines that, among the servers, a server that avoids risk of non-compliance with laws and regulations on processing of data acquired from the terminal is the server to be connected to by the terminal; and
transmit, to the server determined by the processor, the request for connection received from the terminal.

2. The connection management device according to claim 1, wherein the processor recognizes that, among the servers, a server existing in a region that is the same as that of the terminal is the server that avoids risk of non-compliance with the laws and regulations on the processing of data acquired from the terminal.

3. The connection management device according to claim 1, further comprising:
a storage to store, in association with each other, the location information and regional information, wherein
the processor regards, as the region where the terminal exits, a region indicated by the regional information associated in the storage with the location information extracted by the processor.

4. The connection management device according claim 1, wherein the location information is information indicating latitude and longitude of the terminal.

5. The connection management device according to claim 1, wherein the location information is a global Internet Protocol (IP) address used by the terminal.

6. The connection management device according to claim 1, wherein the location information is information indicating latitude and longitude of a base station connected by the terminal.

7. The connection management device according to claim 1, wherein the server controls an air conditioner via the terminal.

8. A connection management system in which a connection management device, a terminal, and a plurality of servers are communicatively connected to one another, wherein
the terminal comprises
a terminal processor coupled to a terminal memory, the terminal processor being configured to
acquire, when the terminal transmits a request for connection to one of the plurality of servers, location information indicating a location where the terminal exists,
transmit to the connection management device the request for connection including the location information acquired by the terminal processor, and
receive from the one of the plurality of servers a response to the request for connection,
the connection management device comprises
a connection management device processor coupled to a connection management device memory, the connection management device processor being configured to
receive from the terminal the request for connection,
extract from the request for connection the location information of the terminal,
determine, based on the location information extracted by the connection management device processor, a region where the terminal exists,
determine, based on the region determined by the connection management device processor, which of the plurality of servers is the server to which the terminal is to connect, wherein the connection management device processor determines that, among the servers, a server that avoids risk of non-compliance with laws and regulations on processing of data acquired from the terminal is the server to be connected to by the terminal, and
transmit, to the server determined by the connection management device processor, the request for connection received from the terminal, and
each of the plurality of servers comprises
a server processor coupled to a server memory, the server processor being configured to
receive from the connection management device the request for connection, and
transmit, to the terminal having transmitted the request for connection received from the connection management device, the response including identification information for identifying the server.

9. The connection management system according to claim 8, wherein the connection management device processor recognizes that, among the servers, a server existing in a region that is the same as that of the terminal is the server that avoids risk of non-compliance with the laws and regulations on the processing of data acquired from the terminal.

10. The connection management system according to claim 8, the connection management device further comprising:
a storage to store, in association with each other, the location information and regional information, wherein
the connection management device processor regards, as the region where the terminal exits, a region indicated by the regional information associated in the storage with the location information extracted by the connection management device processor.

11. The connection management system according claim 8, wherein the location information is information indicating latitude and longitude of the terminal.

12. The connection management system according to claim 8, wherein the location information is a global Internet Protocol (IP) address used by the terminal.

13. The connection management system according to claim 8, wherein the location information is information indicating latitude and longitude of a base station connected by the terminal.

14. The connection management system according to claim 8, wherein the server controls an air conditioner via the terminal.

15. A connection management method comprising, by a processor of a connection management device:
receiving, from a terminal a request for connection to a server, the request for connection including location information acquired when the terminal transmits the request for connection and indicating a location where the terminal exists;
determining a region where the terminal exists, based on the location information of the terminal;
determining, based on the region determined by the processor which of a plurality of servers is the server to which the terminal is connected, wherein the processor determines that, among the servers, a server that avoids risk of non-compliance with laws and regulations on processing of data acquired from the terminal is the server to be connected to by the terminal; and transmitting, to the server determined by the processor the request for connection received from the terminal.

16. The connection management method according to claim 15, further comprising recognizing, by the connection management device processor, that, among the servers, a server existing in a region that is the same as that of the terminal is the server that avoids risk of non-compliance with the laws and regulations on the processing of data acquired from the terminal.

17. The connection management method according to claim 15, further comprising:

storing, in a storage associated with the connection management device processor, in association with each other, the location information and regional information, and regarding, by the connection management device processor, as the region where the terminal exits, a region indicated by the regional information associated in the storage with the location information extracted by the connection management device processor.

18. The connection management method according claim 15, wherein the location information is information indicating latitude and longitude of the terminal.

19. The connection management method according to claim 15, wherein the location information is a global Internet Protocol (IP) address used by the terminal.

* * * * *